Aug. 12, 1958     E. C. McRAE     2,847,030
VALVE MEANS FOR TRACTOR HYDRAULIC SYSTEM
Filed Jan. 3, 1955     4 Sheets-Sheet 1

FIG. 1

E. C. McRAE
INVENTOR.

ATTORNEY

E. C. McRAE
INVENTOR.

ATTORNEYS

Aug. 12, 1958 E. C. McRAE 2,847,030
VALVE MEANS FOR TRACTOR HYDRAULIC SYSTEM
Filed Jan. 3, 1955 4 Sheets-Sheet 4

LIFT AT INTERMEDIATE
FULL FLOW

FIG. 8

LOWER

FIG. 9

E. C. McRAE
INVENTOR.
BY J. R. Faulkner
G. H. Oster
ATTORNEYS

United States Patent Office 2,847,030
Patented Aug. 12, 1958

2,847,030

VALVE MEANS FOR TRACTOR HYDRAULIC SYSTEM

Edwin C. McRae, Dearborn, Mich., assignor to Ford Motor Company, Dearborn, Mich., a corporation of Delaware Application January 3, 1955, Serial No. 479,493

18 Claims. (Cl. 137—621)

This invention relates generally to a hydraulic system for tractors, and has particular reference to tractor hydraulic systems employing a constantly operating fluid pump, and one in which a valve operable by the draft of the implement is arranged to connect the pump to the implement lifting ram upon an increase in implement draft and to permit the implement to lower when the draft is reduced to a predetermined amount.

An object of the present invention is to provide an improved hydraulic system for a tractor affording smooth uniform operation during lifting and lowering of the implement. Smoothness of operation during lifting of the implement is achieved by minimizing the initial pressure build-up in the system which may occur at the beginning of a lift stroke due to the sudden application of relatively high pressure fluid to the ram cylinder and to the inertia of the implement which must be overcome. A split flow valve is provided which splits the fluid flow between the ram cylinder and the sump when the servo valve is closed to direct fluid from the pump to the ram cylinder. The arrangement is such that a momentary partial discharge of high pressure fluid to the sump is permitted by the split flow valve to thereby start the lift cycle at a relatively low rate. This overcomes the implement inertia without raising the pump pressure excessively. Smoother operation is obtained, resulting in greater operator comfort and added protection to the tractor components. The split flow valve also operates at the end of a lift stroke to prevent a sudden stop of the implement and the resulting rebound.

Another object of the present invention is to provide a servo valve having three stable positions, namely a lift position, a neutral position and a down drift or lowering position. In an embodiment of the invention a slidable piston is arranged in alignment with the servo valve and is so controlled as to occupy one position during neutral and lift and another position during lowering so as to provide a controlled variable stop for the servo valve enabling three stable positions to be obtained.

A further object of the invention is to provide a tractor hydraulic system in which down drift or lowering of the implement is achieved by regulating constant pressure fluid of relatively low value. An advantage of this construction resides in the fact that when the porting is designed to lower a heavy implement at the maximum safe speed a light implement will be lowered at the same speed. Heretofore, the rate of drop was proportional to the weight of the implement, thus a light implement would have a maximum lowering rate slower than a heavy implement. A more rapid response or drop for light implements such as cultivators results, and they may be controlled so to more closely follow contoured ground. In addition, a much closer regulation of down drift can be obtained since a uniformly low pressure fluid is being regulated by the control valve rather than fluid having a relatively high and variable pressure.

Still another object of the present invention is to increase the sensitivity of the system by the provision of a control valve having offset cross ports permitting sequential operation of the servo valve with a very small movement of the control valve. This is accomplished in the present instance by a simple construction relatively inexpensive to manufacture and yet positive in action. This action is very desirable since it permits response to very small changes in implement draft and thus permits draft regulation for shallow draft implements.

Another object of the invention is to provide a construction wherein during lowering of the implement fluid flows directly to the sump past the split flow valve so that it does not need to overcome the back pressure relief valve spring. Consequently the check valve spring can be made very light and the lifting operation can be effected at a lower pump pressure.

Other objects and advantages of this invention will be made more apparent as this description proceeds, particularly when considered in connection with the accompanying drawings, wherein:

Figure 6 illustrates the control valve mechanism in neutral position. Figure 7 shows the control valve mechanism in lift position at the start and finish (split flow). Figure 8 shows the valve mechanism in intermediate lift position (full flow), and Figure 9 shows the valve mechanism in lowering position.

Figure 1:
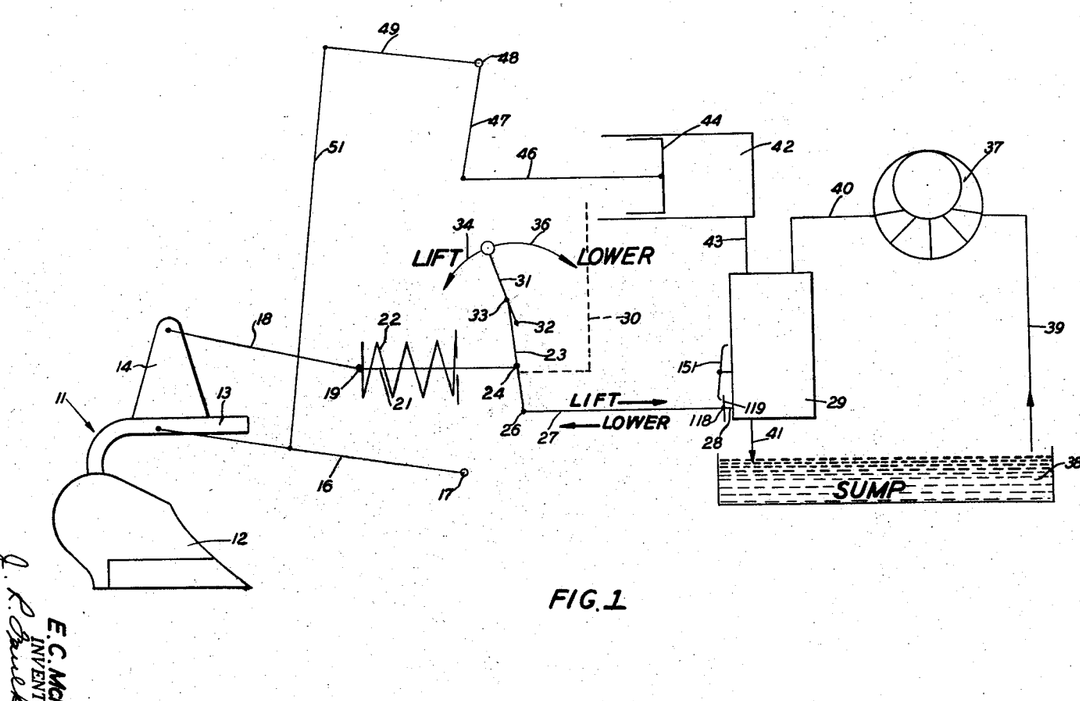
Figure 1 is a diagrammatic view of the hydraulic control system of an agricultural tractor having an implement connected thereto.

Referring now to the drawings, and particularly to Figure 1, the reference character 11 indicates a plow having a plow share 12 carried by a plow beam 13, and provided with an A-frame 14 carried by the plow beam. A pair of lower links 16 are connected at their rearward ends to the plow beam 13 and at their forward ends to the tractor by means of pivotal connections 17. An upper link 18 is pivotally connected at its rearward end to the plow A-frame 14, and at its forward end is connected at the point 19 to a control rod 21 carried by the tractor. A draft resisting compression spring 22 surrounds the control rod 21. The opposite ends of the compression spring 22 bear against the tractor and the upper link 18 respectively, so that reciprocable movement of the control rod 21 will be responsive to the draft upon the plow 11, in the manner of the familiar Ford tractor.

A generally vertical valve control lever 23 is provided, and is pivotally connected intermediate its ends to the rearward end of the control rod 21 by means of a pivotal connection 24. The lower end of the valve control lever 23 is pivotally connected at 26 to a connecting rod 27 which in turn is connected to a control valve 28 reciprocably mounted within a valve block 29.

A manually operable quadrant lever 31 is pivotally connected to the tractor at 32, and is pivotally connected at 33 intermediate its ends to the upper end of the valve control lever 23. This arrangement is conventional and enables the control valve 28 to be operated either by the manually operable quadrant lever 31 or by the draft responsive control rod 21.

When the quadrant lever 31 is moved in the direction of the arrow 34 the valve control lever 23 is pivoted about the fulcrum 24 in a counterclockwise direction, as seen in Figure 1, to move the connecting rod 27 and control valve 28 to the right to a lift position. Movement of the quadrant lever 31 in the opposite direction, as indicated by the arrow 36, reverses the direction of movement of the control valve 28 to move it to the left to a lowering position.

The control valve 28 may also be operated by variations in the draft upon the plow 11. For example, an increase in the draft upon the plow share 12 increases the compression force supplied by the upper link 18 to the compression spring 22, moving the control rod 21 to the right. This results in swinging the valve control lever 23 in a counterclockwise direction about the fulcrum 33, which remains fixed for any given quadrant lever position, to move the control valve 28 to the right to a lift position. Conversely, a decrease in draft upon the plow decreases the compression force supplied to the spring 22 by the upper link 18, moving the control rod 21 to the left and swinging the valve control lever 23 in a clockwise direction about the fulcrum 33, thus shifting the control valve 28 to the left to a lowering position.

The control valve 28 may still further be operated by the ram piston when it reaches the extreme position of its travel. In the actual embodiment of this invention the ram piston is conventionally arranged to contact a pin extending laterally from the lever 23 so as to move the control valve to its neutral position when the piston reaches the end of its stroke. The pin connection is shown diagrammatically by dotted lines 30 in Figure 1.

A fluid pump 37, here shown as of the vane type, is carried by the tractor and suitably driven by the tractor engine. The pump 37 is supplied with fluid from a sump 38 through the pump supply conduit 39, and the discharge or pressure side of the pump is connected to the valve block 29 by means of the pump output conduit 40.

The valve mechanism contained within the valve block 29 will be described in detail later, and is constructed so as to discharge the pump output to the sump through the return conduit 41 or to direct the fluid to the ram cylinder 42 through the ram supply conduit 43, under the control of the control valve 28. The ram cylinder 42 is carried by the tractor and is provided with a reciprocable piston 44 connected by means of a connecting rod 46 to a crank arm 47 secured to a shaft 48 journaled upon the tractor. A pair of lift arms 49 are operated by the shaft 48 and are connected to the lower links 16 by means of a pair of lift rods 51.

The above described construction is conventional and is embodied in the present Ford tractor.

Reference is now made to Figures 2 to 5 inclusive for a description of the valve mechanism contained within the valve block 29. The valve block 29 is provided with a plurality of valve bores 52, 53, 54, 55, and 56 which house respectively a check valve assembly 57, a split flow valve 58, the control valve 28, a servo valve 59 and a piston 61. In addition, the valve block 29 is provided with a low pressure relief valve 62. Backing plates 63 and 64 are secured to opposite sides of the valve block 29. As is conventional in tractor hydraulic systems, the valve block 29 is disposed within an enclosed chamber which functions as a sump for the hydraulic system, and accordingly passageways to the exterior of the valve block constitute connections to the sump.

Figures 2, 3, 4, 5:
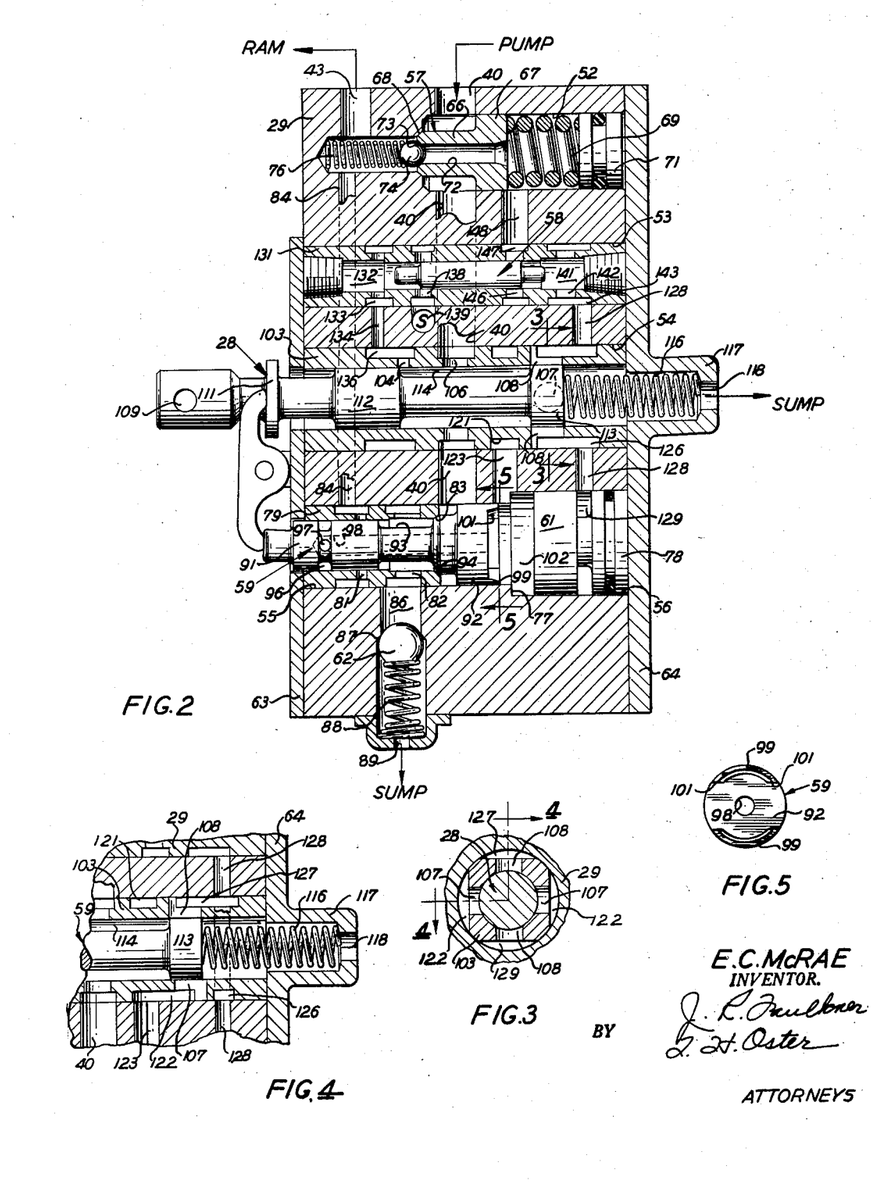
Figure 2 is an enlarged cross sectional view of the valve block shown in Figure 1.
Figure 3 is a cross sectional view taken on the line 3—3 of Figure 2.
Figure 4 is a cross sectional view of a portion of the valve block shown in Figure 2, taken on the line 4—4 of Figure 3.
Figure 5 is an end elevation of the servo valve, as seen when viewed on the line 5—5 of Figure 2.

The check valve assembly 57 comprises a valve body 66 having an enlarged head 67 reciprocable within the bore 52. The end of the valve body is urged toward seating engagement with a conical valve seat 68 in the valve block 29 by a coil spring 69, the latter being retained in place by a fixed plug 71. The valve body is provided with an axial passageway 72 therethrough formed at one end with a conical valve seat 73. A check valve ball 74 is biased by a spring 76 into seating engagement with the valve seat 73.

Valve bores 55 and 56 are axially aligned with each other, and bore 56 is substantially larger in diameter than bore 55 to form a shoulder 77 therebetween. Valve bore 56 is provided with an end plug 78, and the piston 61 is arranged to reciprocate within the bore 56 between the predetermined limits established by the shoulder 77 and the plug 78.

Mounted within the valve bore 55 is a valve sleeve 79. The sleeve 79 is formed with axially spaced passageways 81 and 82 therethrough, and its right hand end is formed with a valve seat 83. The passageway 81 in the valve sleeve communicates with a passageway 84 in the valve block which is in effect a continuation of the ram supply conduit 43. The passageway 82 in the valve sleeve communicates with a discharge passageway 86 in the valve block and the latter in turn is provided with a valve seat 87 engaged by the back pressure relief valve 62. A spring 88 biases the relief valve toward its seat and maintains a predetermined minimum low pressure within the hydraulic system when the pump is operating and the control is in neutral. When opened, the relief valve 62 permits fluid from the pump to be discharged through a port 89 to the sump.

The servo valve 59 is formed with a body portion 91 reciprocable within the valve sleeve 79 and with an enlarged head portion 92. An annular groove 93 is provided between the body portion 91 and the head 92 of the servo valve and normally establishes communication between the pump output conduit 40 and the passageways 82 and 86 to the low pressure relief valve 62. Except when the implement is being lifted or lowered, this path permits the output of the constantly operating pump to be bypassed to the sump, while at the same time maintaining a predetermined low pressure in the system, as for example 20 p. s. i., due to the back pressure relief valve 62.

The head 92 of the servo valve 59 is formed with a conical surface 94 in axial alignment with a corresponding conical valve seat 83 formed at the end of the valve sleeve 79. It will be seen that axial movement of the servo valve 59 to the left to engage the conical surfaces 83 and 94 is effective to cut off the flow of fluid from the pump output conduit 40 to the discharge passageway 86 and the relief valve 62. The resulting pressure build-up is effective, in the manner to be described more in detail hereinafter, to supply fluid at high pressure to the bore 52 and through the axial passageway 72 in the check valve 57 and to unseat the ball 74 to furnish fluid to the ram supply conduit 43 to lift the implement.

The body portion 91 of the servo valve 59 is formed with an annular peripheral groove 96 connected by radial ports 97 to an axial passageway 98 extending through the valve to the right hand end thereof. As best seen in Figure 5, the end of the enlarged head 92 of the servo valve 59 is formed with a pair of diametrically opposed arcuate flanges 99 at the periphery thereof adapted to engage the piston 61. The flanges 99 are separated by a diametral groove 101 to provide fluid communication between the axial passageway 98 in the servo valve and the chamber 102 in the valve bore 56 between the servo valve 59 and the piston 61.

The valve bore 54 in the valve block is provided with a valve sleeve 103 formed with axially spaced ports 104, 106, 107, and 108 therethrough. The control valve 28 is mounted for reciprocation within the valve sleeve 103 and is provided with a pivotal connection 109 to the connecting rod 27 which in turn is reciprocated by the valve actuating lever 23, as previously described and shown in Figure 1. The control valve 28 is formed with an enlarged flange 111 adjacent its head and with a pair of spaced lands 112 and 113 forming an annular chamber 114 therebetween. A coil spring 116 biases the control valve to the left. The spring 116 is retained in place by means of a cap 117 formed in the backing plate 64. The cap 117 is formed with a port 118 providing communication between the interior thereof and the sump.

The port 106 in the valve sleeve 103 is in constant communication with the annular chamber 114 between the lands 112 and 113 of the control valve, and is also in constant communication with the pump output conduit 40. It will be seen that pump pressure is continually supplied to the annular chamber 114 of the control valve, regardless of whether the servo valve 59 is open or closed.

Referring now to Figures 3 and 4, as well as to Figure 2, a pair of diametrically opposite cross ports 107 are provided in the valve sleeve 103 at right angles to a second pair of diametrically opposite cross ports 108. The two pairs of cross ports are offset axially with respect to each other, the ports 108 being a short distance, as for example .008", to the left of the ports 107.

The cross ports 107 in the valve sleeve communicate with a peripheral groove 121 by means of flats 122 on the periphery of the valve sleeve 103, and this groove in turn communicates with a passageway 123 leading to the chamber 102 formed in the valve bore 56 between the servo valve 59 and the piston 61. The chamber 102 is thus placed in communication with either the pump or with the sump depending upon the position of the land 113 of the control valve with respect to the cross ports 107.

The cross ports 108 communicate with a peripheral groove 126 by means of flats 127 on the periphery of the valve sleeve 103. The groove 126 in turn communicates with a passageway 128 leading to the chamber 129 formed in the valve bore 56 between the piston 61 and the end plug 78. Thus, the chamber 129 may be placed in communication either with the pump or the sump depending upon the position of the land 113 of the control valve 28 with respect to the cross ports 108. From the foregoing it will be seen that the groove 126, flats 127 and openings 108 form a continuous passageway connecting the annular chamber 114 with the passageway 128, and that the groove 121, flats 122 and openings 107 form another continuous passageway connecting the chamber 114 with the passageway 123.

The valve bore 53 in the valve block 29 has mounted therein a valve sleeve 131 which in turn reciprocally receives the split flow valve 58. The chamber 132 at the left hand end of the split flow valve communicates through passageways 133 and 134 with the annular peripheral groove 136 formed in the valve sleeve 103 for the control valve, and thence through port 104 in the valve sleeve to the annular chamber 114 between the lands 112 and 113 of the control valve. As previously mentioned, this chamber is in constant communication with the pump and accordingly pump pressure is supplied to the left hand end of the split flow end 58. The port 104 forms a restricted orifice to effect a pressure drop at the split flow valve.

With the split flow valve in the position shown in Figure 2, the chamber 132 at the left hand end of the valve is in communication with the sump through the ports 138 in the valve sleeve 131 and the passageway 139, thus providing a second discharge path from the pump to the sump in addition to the path provided through the low pressure relief valve 62.

The chamber 141 at the right hand end of the split flow valve 58 communicates through ports 142 and an annular peripheral groove 143 with the passageway 128 leading to the cross ports 108 associated with the control valve.

The valve sleeve 131 for the split flow valve 58 is also formed with radial ports 146 and a peripheral groove 147 communicating with a passageway 148 leading to the bore 52 for the check valve 57.

For the sake of simplicity and clearness Figures 6 to 9 inclusive, which illustrate various positions of the valve mechanism, have been drawn in somewhat schematic and simplified fashion.

Figure 6:
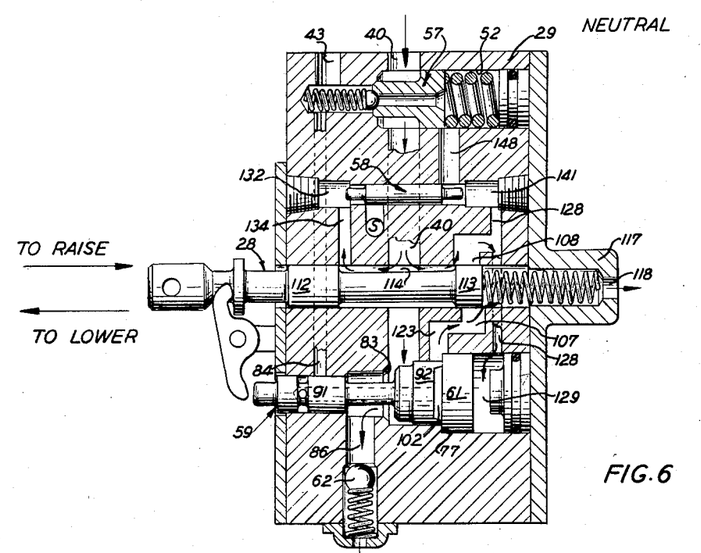
Figures 6, 7, 8, and 9 are cross sectional views somewhat similar to Figure 2 but drawn in a simplified and schematic manner, and also differing therefrom in that the section through the control valve is taken on the line 4—4 as in Figure 3. This is done to better illustrate the sequential functioning of the servo valve.

In the operation of the above described hydraulic system, when the control valve 28 is in the position shown in Figure 6 the system is in neutral and no fluid will be either supplied to or withdrawn from the ram cylinder 42. In neutral the control valve 28 is positioned so that the end land 113 uncovers the left hand portions of the cross ports 108 and the right hand portions of the cross ports 107. Low pressure fluid is then supplied through the pump output conduit 40 and annular groove 114 to the cross ports 108 and the passageway 128 to the chamber 129 in back of the piston 61, forcing the piston 61 to the left until stopped by the shoulder 77 formed in the bore.

At the same time the chamber 102 between the servo valve 59 and the piston 61 is in communication through the cross ports 107 and the port 118 in the cap 117 to the sump. Since low pressure fluid from the pump output conduit 40 acts upon the servo valve 59 over the area corresponding to the difference between the area of the head 92 and the area of portion 91 of the valve the latter is moved to the right into engagement with the piston 61. In this position the servo valve is open and pump fluid is discharged from the pump output conduit 40 through the passageway 86 and the low pressure relief valve 62 to the sump with the relief valve maintaining a predetermined low pressure in the system.

It will be noted that in neutral the low pressure fluid acts upon the left hand end of the head 92 of the servo valve 59 and upon the right hand end of the piston 61. Since the piston 61 has a greater area than the effective area of the head of the servo valve the piston seats against the shoulder 77 and thus determines the position of the servo valve in neutral. In this position the servo valve not only bypasses the fluid from the pump to the sump but also blocks the discharge from the ram cylinder to the sump by covering the passageway 84 from the ram supply conduit 43.

Movement of the control valve 28 to the right from the neutral position shown in Figure 6 is effective to lift the implement. This movement of the control valve can be effected either by a manual operation of the quadrant lever 31 in a lift direction, by an increase in the draft upon the implement, or by movement of the ram piston from the outer end of its stroke. The increased draft results from a variation in the soil conditions, while operation by the ram piston is caused by a gradual drift down of the implement due to leakage in the system.

Figure 7:
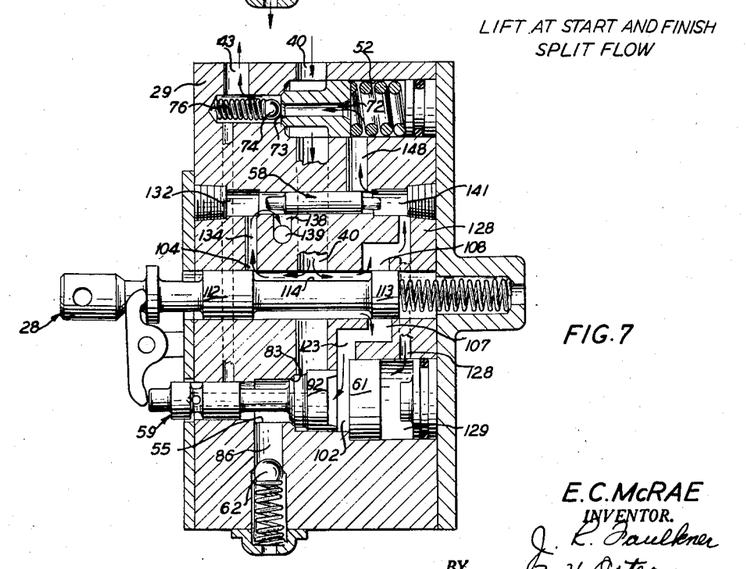

The initial movement of the control valve 28 to the right causes the end land 113 of the control valve to overlap the cross ports 107 and to thus cut off the communication from the chamber 102 between the servo valve 59 and the piston 61 to the sump. The land 113 may be made slightly wider than the width of the cross ports 107, as for example .002" wider. Continued movement of the control valve 28 to the right, as shown in Figure 7, next uncovers the left hand portion of the cross ports 107 to direct low pressure fluid from the pump outlet conduit 40 through annular chamber 114, ports 107 and passageway 123 to the chamber 102 between the servo valve and the piston. The pressure in chamber 102 acts upon the head 92 of the servo valve 59 to move it to the left into seating engagement with the valve seat 83. This movement is possible because at such time the pressure in chamber 102 acts upon the full area of head 92 to move it to the left while the pressure in bore 55 tending to move the valve to the right acts only on a differential area. This closing of the servo valve cuts off the path from the pump to the sump through the passageway 86 and the relief valve 62, resulting in immediately and sharply increasing the pressure in the valve bore 52. High pressure fluid from the pump is thus directed through cross ports 108, passageway 128, chamber 141 and passageway 148 to the bore 52 and moves ball 74 against the action of spring 76 from its seat 73 to permit fluid from the pump to flow freely through the check valve 57 to the ram supply conduit 43 and thence to the ram cylinder 42 to lift the implement.

In conventional hydraulic systems of this type, an extreme pressure build-up in the ram cylinder is experienced at the instant the servo valve is closed. The inertia of a heavy implement may cause a momentary pressure build-up to a value several times higher than the ram static pressure. This severe pressure build-up is objectionable in that it may cause a rough jerky lift and in addition may be injurious to components of the hydraulic system and of the tractor. With the present construction the pressure build-up at the instant the servo valve its closed is materially reduced by the split flow valve 58 which permits a partial discharge of fluid at the time of initial engagement.

Figure 8:
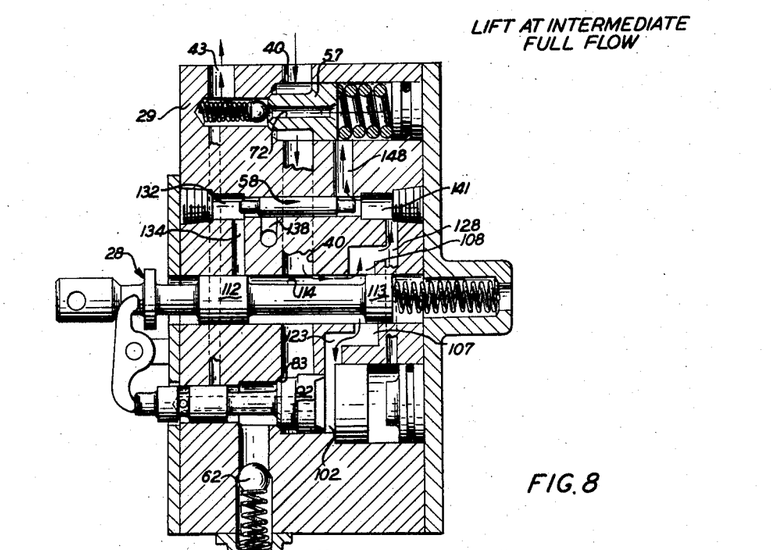

Upon reference to Figure 7 it will be seen that fluid from the pump is directed to the chamber 132 at the left hand end of the split flow valve 58 through the restricted orifice 104, while fluid from the pump is directed to the chamber 141 at the right hand end of the split flow valve without material restriction through the passageway 128. Initially the split flow valve 58 is positioned to uncover the passageway 138 to the sump and consequently high pressure fluid is discharged through this path as soon as the servo valve is closed. Inasmuch as the restricted orifice 104 results in a pressure drop, however, the pressure impressed upon the left hand end of the split flow valve will be less than the full pump pressure impressed upon the right hand end thereof. As a result, the split flow valve 58 is moved to the left, as shown in Figure 8, to close the passageway 138 to the sump and to thus require the total discharge of the pump to be momentarily transmitted to the ram cylinder. At this instant the pressure drops within chamber 141 while it raises in the chamber 132. This causes the valve 58 to move to the right and open the pressure circuit to the sump. The cycle is then repeated to again force fluid to the ram. The reciprocation of the valve 58 is very rapid and in effect splits the flow of fluid, partly to the ram and partly to the sump. The ratio of the fluid supplied to the ram and sump is in direct proportion to the areas of the opening 107 uncovered by the land 113 and the area of port 104. When valve 28 is in the position shown in Figure 7, split flow will result and the ram will be moved at a slow rate with part of the oil being discharged to the sump. This slow rate of lift is particularly advantageous when operating grading blades at it permits the gradual dumping of the dirt in contrast to a sudden dumping as occurs when the blade is suddenly raised.

However, in normal operation of the valve 28 by either the quadrant or the draft control the valve 28 is moved from its neutral position shown in Figure 6 through the split flow position, shown in Figure 7, to the full flow position, shown in Figure 8. The split flow position (Figure 7) is thus only a transitory position but it is still long enough to take the initial shock load off the system. When the valve 28 is in the full flow position shown in Figure 8, the port 104 is covered by the land 112 so that no oil can flow to passageway 134. All of the oil must therefore flow through the ports 108 to chamber 141 and from there to the ram cylinder through passageways 143, 72 and 43. The ram is at such times raised at its maximum rate as governed by the oil from the pump.

When the lift is complete, the control valve 28 is moved to the left from the position shown in Figure 8, to that shown in Figure 7 which causes the ram to slow down just before valve moves to the neutral position shown in Figure 6 where the oil supply is cut off. In neutral the land 113 on the valve closes the cross ports 107 to cut off the supply of fluid to the chamber 102 between the servo valve 59 and the piston. Continued movement of the control valve 28 to the left opens cross ports 107 (and the chamber 102) to the sump through port 118. Servo valve 59 is then free to move to the right to open valve seat 83 and connect the pump output conduit 40 with the sump through the low pressure relief valve 62. Near the end of the left stroke the land 112 of the control valve 28 uncovers port 104 admitting fluid to the chamber at the left of the split flow valve 58 to divide the flow and direct a portion of the high pressure fluid to the sump through passageways 138 and 139, thus cushioning the implement and preventing a sudden stop and rebound.

Figure 9:
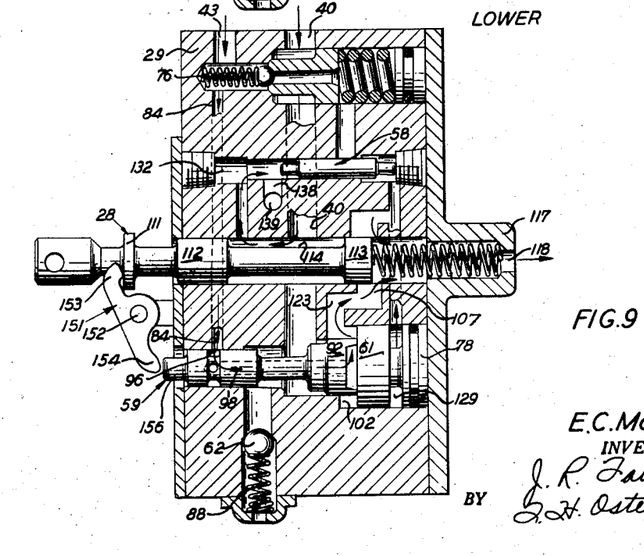

Movement of the control valve 28 to the left from the neutral position shown in Figure 6 is effective to lower the implement. As seen in Figure 9, leftward movement of the control valve 28 causes the end land 113 of the valve to first overlap the cross ports 108 and cut off the supply of pump pressure to the chamber 129 at the right hand of the piston, and then uncovers the right hand portion of the ports 108 to connect the chamber 129 to the sump through the port 118 in the end cap 117. With the chambers 102 and 129 thus both connected to the sump, the pump pressure applied to the differential area of the rear face of the head 92 of the servo valve 28 is effective to move the servo valve 28 and the piston 61 to the right to the position shown in Figure 9 in which the piston engages the end plug 73. This aligns the annular discharge groove 96 in the servo valve 59 with the passageway 84 from the ram cylinder and establishes communication from the ram cylinder through the axial passageway 98 in the servo valve to the chamber 102 between the servo valve and the piston and thence through the passageway 123 and cross ports 107 to the sump, permitting the implement to start to drop. The leftward movement of the control valve 28 to effect the lowering of the implement may be either the result of manual operation of the quadrant lever 31 or a change in draft upon the implement. During the lowering of the implement the pump output is connected directly to the sump through passageways 138 and 139 uncovered by the split flow valve 58. As a result the check valve spring 76 can be made lighter than if the pump output were required to overcome the low pressure relief valve spring 88. Consequently the pressure required to lift the implement is less due to the lighter check valve spring.

A feature of the present construction resides in the fact that the constant pressure fluid of relatively low pressure is controlled or regulated to control the down drift or drop of the implement regardless of the weight of the implement. This enables a relatively light implement such as a cultivator to drop at the same speed as a heavy implement such as a plow, and is of value in securing improved implement operation. For example, in a conventional tractor hydraulic system in which high pressure fluid is regulated for down drift the ram discharge port must be small enough so that a heavy implement will not drop too fast. A fast drop of a plow on a concrete drive will break the plow share. Consequently the port will be too small for fast response of a light implement such as a cultivator. In cultivating contoured ground it is important that the cultivator be permitted to drop quickly to follow the contour of the ground and this may not be possible where the porting has been restricted to prevent excessively fast dropping of a heavy implement.

Referring again to Figure 9, the low pressure pump fluid regulated by the low pressure relief valve 62 acts upon the differential area of the head 92 of the servo valve 59 to urge it to the right. At the same time the chamber 102 between the servo valve 59 and the piston 61 will automatically be maintained at a pressure just sufficient to overcome the low pressure on the servo valve head. Since the low pressure is applied only to the differential area between the valve head and the intermediate reduced portion of the valve, a smaller pressure in the chamber 102 will be sufficient to overcome this and to move the servo valve to the left since the entire right hand end of the valve head is subjected to this latter pressure. For example, with regulated pump pressure fluid of 20 p. s. i. applied to the left hand end of the servo valve head a pressure build-up in the chamber 102 of approximately 15 p. s. i. will be sufficient to move the servo valve to the left. This movement of the servo valve to the left restricts the communication between the ram cylinder passageway 84 and the valve port 96 and maintains this communication at a restriction such that a constant pressure of approximately 15 p. s. i. will be maintained in the chamber 102 between the servo and neutral valves. Since the chamber 102 is exhausted to the sump through the passageway 123 and the cross ports 107 the rate of discharge from the ram cylinder for any given control valve position will be uniform. A uniform down drift of the implement regardless of its weight is thus obtained. It is possible to regulate the rate of down drift due to the fact that the control valve 28 need only partially open the ports 107. Thus less fluid from the ram cylinder will be sufficient to maintain the 15 p. s. i. required in the chamber 102 when the ports 107 are only partially open.

Means are provided for effecting a lowering of the implement even though the tractor may be stopped and the engine and pump inoperative. If the engine is stopped while the implement is in raised position it will remain raised since there is no pressure on the servo valve tending to move it from neutral position. Upon reference to Figure 9 it will be seen that a lever 151 is pivotally mounted intermediate its ends upon a stud 152 carried by the valve block 29. The upper end 153 of the lever is adapted to engage the enlarged flange 111 of the control valve 28 while the lower end 154 of the lever is arranged to engage the terminal extension 156 of the servo valve 59.

To effect a manual lowering of the implement when the engine is stopped, it is only necessary to move the quadrant lever 31 sufficiently to effect a leftward movement of the control valve 28 to rock the lever 151 about its pivotal connection and move the servo valve 59 to the right until the discharge port 96 in the servo valve is in communication with the discharge passageway 84 from the ram cylinder.

It will be noted that the servo valve 59 and the piston 61 cooperate with each other and with the control valve 28 to provide three stable positions for the servo valve, namely a lift position, a neutral position and a down drift or lowering position. Movement of the piston 61 to either the left hand or right hand end of the bore 56 under the control of the control valve 28 enables the three positions to be obtained for the servo valve rather than the usual two.

In the event the pressure in the ram cylinder gets too high, it will act upon the ball 74 and the end 68 of the valve 66 to force the valve to the right against the action of spring 69. This valve movement connects the ram cylinder to the sump through conduit 40, past valve seat 83—94, and through passageway 86, thus performing a relief valve function.

Although the valve mechanism has been shown herein as applied to a tractor having a draft control type of linkage, it is equally adaptable to tractors having position control as well, and to other types of hydraulic mechanisms.

It will be understood that the invention is not to be limited to the exact construction shown and described, but that various changes and modifications may be made without departing from the spirit and scope of the invention, as defined in the appended claims.

What is claimed is:

1. Valve mechanism for a hydraulic system of the type wherein pump output fluid is either bypassed to a sump or is directed to a work producing mechanism, and wherein fluid from the work producing mechanism is discharged to the sump, comprising a valve housing having an inlet port adapted to be connected to said pump, return means adapted to be connected to said sump and an outlet port adapted to be connected to said work producing mechanism, a valve reciprocably mounted in said valve housing for movement between one open and two closed positions, said valve being moveable in one direction to a closed position closing communication between said inlet port and said return means to build up pressure in said outlet port, hydraulically actuated valve positioning means independently reciprocable between two predetermined positions, said valve being moveable in the opposite direction to one of two open positions determined by the position of said positioning means, said valve in one of said two last mentioned positions opening communication between said inlet port and said return means and, in the other of said two last mentioned positions opening communication between said outlet port and said return means.

2. The structure defined by claim 1 wherein said positioning means is axially aligned with said valve and wherein said valve in said last two mentioned open positions directly contacts said positioning means.

3. The structure defined by claim 1 which is further characterized in that a manually operable control valve is reciprocably mounted within said valve housing, said control valve being arranged to selectively connect said first valve and said positioning means to said inlet port or said return means, and a check valve in said valve housing is disposed between said inlet port and said outlet port.

4. The structure defined by claim 1 which is further characterized in that a manually operable control valve is reciprocably mounted within said valve housing, said control valve having axially offset ports communicating respectively with a first fluid chamber between said first valve and said positioning means, and a second fluid chamber on the opposite side of said positioning means to sequentially admit fluid from said inlet port to said chambers upon movement of said control valve in one direction and to sequentially in the reverse manner connect said first and second chambers to said return means upon movement of said control valve in the opposite direction.

5. Valve mechanism for a tractor hydraulic system of the type wherein pump output fluid is either bypassed to a sump or is directed to a lift cylinder connected to an implement to lift the latter and wherein fluid from the lift cylinder is discharged to the sump to lower the implement, comprising a valve housing having an inlet port adapted to be connected to said pump, return means adapted to be connected to said sump, and an outlet port adapted to be connected to said lift cylinder, a valve reciprocably mounted in said valve housing and movable in one direction to a closed position closing communication between said inlet port and said return means to build up pressure in said lift cylinder to lift said implement, a piston independently reciprocable between two predetermined positions, said valve being movable in the opposite direction into engagement with said piston and to one of two positions determined by the position of said piston, said valve in one of said two last mentioned positions opening communication between said inlet port and said return means and in the other of said two last-mentioned positions opening communication between said outlet port and said return means to lower the implement.

6. The structure defined by claim 5 wherein said piston is axially aligned with said valve and wherein said valve in said last two mentioned positions contacts said piston.

7. The structure defined by claim 5 which is further characterized in that a manually operable control valve is reciprocally mounted within said valve housing, said control valve having axially offset ports communicating respectively with a first fluid chamber between said first valve and said piston, and a second fluid chamber on the opposite side of said piston to sequentially admit fluid from said inlet port to said chambers upon movement of said control valve in one direction and to sequentially in the reverse manner connect said first and second chambers to said return means upon movement of said control valve in the opposite direction.

8. Valve mechanism for a tractor hydraulic system of the type wherein pump output fluid is either bypassed to a sump or is directed to a lift cylinder connected to an implement to lift the latter and wherein fluid from the lift cylinder is discharged to the sump to lower the implement, comprising a valve housing having an inlet port adapted to be connected to said pump, return means adapted to be connected to said sump, and an outlet port adapted to be connected to said lift cylinder, a valve bore in said housing having a valve seat therein, a servo valve reciprocable in said bore and adapted upon movement in one direction to engage said valve seat, a second bore in substantial axial alignment with said first bore, a reciprocable member in said second bore, axially spaced stops in said second bore limiting axial movement of said member in opposite directions and determining two end positions of said member, means on said servo valve arranged to engage said member upon movement of said servo valve away from said valve seat, and hydraulic means for moving said member said two end positions to determine two definite positions for said servo valve in addition to the position of said servo valve in engagement with said valve seat.

9. The structure defined by claim 8 which is further characterized in that first and second fluid chambers are formed between said servo valve and said member and between said member and the end of said second bore respectively, first and second passageways communicating with said first and second fluid chambers respectively, and a manually operable control valve selectively connecting said first and second passageways to said inlet port and said return means to selectively move said member against one or the other of said stops.

10. The structure defined by claim 8 which is further characterized in that first, second and third axially spaced passageways communicate with said first bore and with said inlet port, said return means and said outlet port respectively, said servo valve being arranged to close communication between said first and second passageways when in engagement with said valve seat and to open communication between said first and second passageways when in engagement with said reciprocable member in either of the two end positions of said member, and said servo valve being arranged to establish communication between said third passageway and said return means to said outlet port to said return means and lower the implement only when said servo valve is in engagement with said reciprocable member and said member is in the one of its two end positions most remote from said valve seat.

11. Valve mechanism for a tractor hydraulic system having a pump, a sump and a lift cylinder operatively connected to an implement, the improvement comprising a valve housing having an inlet port adapted to be connected to said pump, return means adapted to be connected to said sump, and an outlet port adapted to be connected to said lift cylinder, said valve housing also having a pair of valve bores, a servo valve reciprocably mounted in one of the bores in said valve housing and arranged to control the flow of fluid between said inlet port, return means and outlet port, a manually operable control valve reciprocably mounted in the other of said valve bores, said housing having a pair of ports adjacent said control valve bore and a pair of passageways establishing communication between said pair of ports and said servo valve bore, said pair of ports being circumferentially spaced from each other around said control valve bore and also axially spaced from each other along said control valve bore a relatively short distance to permit sequential operation of said servo valve with a small movement of said control valve.

12. The structure defined by claim 11 which is further characterized in that a valve sleeve is mounted within the control valve bore of said valve housing and reciprocably receives said control valve, said pair of ports being formed in said valve sleeve in angular relationship to each other with respect to the axis of said sleeve, and said control valve having a land thereon arranged to sequentially connect said pair of ports to said inlet port in one direction of movement of said control valve and to sequentially connect said pair of ports to said return means in the opposite direction of movement of said control valve.

13. Valve mechanism for a tractor hydraulic system having a pump, a sump, and a lift cylinder operatively connected to an implement, the improvement comprising a valve housing having an inlet port adapted to be connected to said pump, return means adapted to be connected to said sump and an outlet valve adapted to be connected to said lift cylinder, a first valve reciprocably mounted in said valve housing and movable to a position closing communication between said inlet port and said return means to build up pressure in said lift cylinder to lift the implement, a second normally open valve in said housing affording an independent path bypassing fluid from said inlet port to said return means, and means subjecting said second mentioned valve to an intermittent differential pump pressure at opposite ends thereof when said pump pressure is increased by the closing of said first mentioned valve to permit a partial discharge of high pressure fluid from the pump to the sump and to permit the remainder of high pressure to flow to said outlet port.

14. The structure defined by claim 13 which is further characterized in that said independent path for bypassing fluid from said inlet port to said return means is capable of being varied in size to vary the proportion of fluid discharged to the return means.

15. The structure defined by claim 13 which is further characterized in that a pair of passageways in said valve housing provide communication between the opposite ends of said second mentioned valve and said inlet port, and means for varying the relative size of said passageways to thus vary the proportion of fluid supplied to said outlet port and return means, respectively.

16. The structure defined by claim 13 which is further characterized in that a pair of passageways in said valve housing provide communication between the opposite ends of said second mentioned valve and said inlet port, and wherein a reciprocally mounted control valve is arranged to open one of said passageways while closing the other when moved in one direction and to close said first passageway and open the other when moved in the opposite direction to thus vary the proportion of fluid from said inlet port to said outlet port and return means, respectively.

17. Valve mechanism for a tractor hydraulic system having a pump, a sump, and a lift cylinder operatively connected to an implement, a valve housing having an inlet port adapted to be connected to said pump, return means adapted to be connected to said sump, and an outlet port adapted to be connected to said lift cylinder, a bypass passageway in said housing establishing communication between said inlet port and said return means, a low pressure relief valve in said bypass passageway to maintain a predetermined low pressure within the system, a discharge passageway in said housing communicating with said outlet port, a servo valve reciprocably mounted in said housing and having a port adapted to regulate the discharge of fluid from said outlet port through said discharge passageway, an additional passageway establishing communication between the port in said servo valve and a part of said servo valve to urge said servo valve in a direction to restrict the communication between said discharge passageway and said servo valve port to maintain a constant relatively low pressure adjacent said part of said servo valve, and means establishing communication between said part of said servo valve and said return means.

18. The structure defined by claim 17 which is further characterized in that a manually operable control valve is reciprocably mounted in said valve housing in position to regulate the discharge of said low pressure fluid to said return means through said means.

References Cited in the file of this patent

UNITED STATES PATENTS

| | | |
|---|---|---|
| 2,459,613 | Baker | Jan. 18, 1949 |
| 2,477,710 | Worstell | Aug. 2, 1949 |
| 2,495,785 | Stephens | Jan. 31, 1950 |
| 2,679,263 | Kiser et al. | May 25, 1954 |